(12) United States Patent
Meier et al.

(10) Patent No.: US 8,976,670 B2
(45) Date of Patent: Mar. 10, 2015

(54) SYSTEM AND METHOD FOR DELIVERING PACKET DATA OVER A MULTIPLICITY OF COMMUNICATION LINKS

(75) Inventors: Rolf Meier, Carp (CA); Joseph Shapiro, Montreal West (CA)

(73) Assignee: Rockstar Consortium US LP, Plano, TX (US)

( * ) Notice: Subject to any disclaimer, the term of this patent is extended or adjusted under 35 U.S.C. 154(b) by 530 days.

(21) Appl. No.: 11/600,492

(22) Filed: Nov. 16, 2006

(65) Prior Publication Data

US 2010/0061244 A1    Mar. 11, 2010

(51) Int. Cl.
| H04L 12/28 | (2006.01) |
| H04L 12/701 | (2013.01) |
| H04L 12/729 | (2013.01) |
| H04L 12/707 | (2013.01) |
| H04L 12/725 | (2013.01) |
| H04L 12/801 | (2013.01) |
| H04L 12/835 | (2013.01) |

(52) U.S. Cl.
CPC ............ *H04L 12/2867* (2013.01); *H04L 45/00* (2013.01); *H04L 45/125* (2013.01); *H04L 45/24* (2013.01); *H04L 45/306* (2013.01); *H04L 47/10* (2013.01); *H04L 47/12* (2013.01); *H04L 47/14* (2013.01); *H04L 47/29* (2013.01); *H04L 47/30* (2013.01)
USPC ...................................................... 370/237

(58) Field of Classification Search
CPC ..... H04L 12/2867; H04L 47/14; H04L 45/24; H04L 47/12; H04L 47/30; H04L 47/29; H04L 47/10; H04L 45/00; H04L 45/306; H04L 45/125

USPC .......... 370/229, 235, 237, 230, 231, 464, 474
See application file for complete search history.

(56) References Cited

U.S. PATENT DOCUMENTS

| 6,222,837 | B1 * | 4/2001 | Ahuja et al. ................... 370/352 |
| 6,678,245 | B1 * | 1/2004 | Cooper et al. ................. 370/230 |
| 7,289,489 | B1 * | 10/2007 | Kung et al. .................... 370/352 |
| 2002/0091858 | A1 * | 7/2002 | Yasaki et al. ................... 709/238 |
| 2003/0161265 | A1 * | 8/2003 | Cao et al. ....................... 370/229 |
| 2007/0147234 | A1 * | 6/2007 | Walter et al. ................... 370/229 |
| 2007/0217338 | A1 * | 9/2007 | Wang et al. .................... 370/252 |
| 2007/0223377 | A1 * | 9/2007 | de Heer ......................... 370/235 |

* cited by examiner

*Primary Examiner* — Obaidul Huq
(74) *Attorney, Agent, or Firm* — Christopher & Weisberg, P.A.

(57) ABSTRACT

This invention provides a system, method and apparatus for managing congestion on heterogeneous network communication links, the first communication link and second communication link being heterogeneous with respect to each other. The system, method and apparatus including a routing decision module, the routing decision module evaluating a queue of information packets scheduled for transmission across the first communication link to determine whether to generate a command signal to route a portion of information packets over the second communication link. The system, method and apparatus may further include a communication link threshold module, the communication link threshold module storing threshold limit values corresponding to a first communication link technology of the first communication link.

12 Claims, 3 Drawing Sheets

SYSTEM AND METHOD FOR DELIVERING PACKET DATA OVER A MULTIPLICITY OF COMMUNICATION LINKS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to communication networks, and more particularly to a method, system and apparatus that provides for control of routing data packets over heterogeneous communication links of a communication network.

BACKGROUND OF THE INVENTION

Traditionally, a television ("TV") signal is received on one wire, e.g., cable TV, or a terrestrial antenna. A telephone signal is received on a separate signal transmission medium, e.g., the plain old telephone system ("POTS"), and the Internet has been available on either of these "systems". Both cable operators and telephone company operators are beginning to offer all three system services on one connection, which is commonly referred to as "triple play" and is used by service operators to describe the bundling of telephony, data and video down a single connection.

Internet Protocol Television ("IPTV") describes a system where a digital television service is delivered using the Internet Protocol ("IP") over a network infrastructure, which may include delivery by a broadband connection. Broadband in telecommunications is a term which refers to a transmission method which includes or handles a relatively wide range of frequencies which may be divided into channels or frequency bins. Broadband is a relative term, understood according to its context. The wider the bandwidth, the more information that can be carried. In radio, for example, a very narrowband signal can carry Morse code; a broader band can carry speech; a yet broader band is required to carry music without losing the high audio frequencies required for realistic sound reproduction. A television antenna described as "normal" may be capable of receiving a certain range of channels; one described as "broadband" can receive more channels.

In data communications, a voiceband modem will transmit a bit rate of 56 kilobits per seconds (kbit/s) over a telephone line; over the same telephone line a bit rate of several megabits per second can be handled by a DSL broadband modem, which is described as broadband (relative to a voiceband modem over a telephone line, although much less than can be achieved over a fiber optic circuit, for example). For residential users, IPTV is often provided in conjunction with video on demand ("VoD") and may be bundled with Internet services such as Web access and voice over Internet Protocol ("VoIP"). IPTV is typically supplied by a broadband operator using a closed network infrastructure. This closed network approach is in competition with the delivery of TV content over the public Internet. This type of delivery is widely called TV over Internet or Internet Television. In businesses, IPTV may be used to deliver television content over corporate LANs and business networks.

Digital subscriber line ("DSL") is a family of technologies that provide digital data transmission over the wires of a local telephony network. DSL communication links are distance sensitive-technology and thus as the connection's length increases, the signal quality decreases and the connection speed is reduced. In general, DSL communication links are limited in download (from the carrier central office to the DSL modem) bit rate according to the loop length and the amount of noise on the line to a value of up to 25 Mb/s or less. Upload (from the DSL modem to the carrier central office) speed is lower than download speed for asymmetric digital subscriber line ("ADSL") and equal to download speed for symmetric digital subscriber line ("SDSL").

IPTV and video services require substantial bit rate and a value of 25 Mb/s might be insufficient for some users in a given service area. However, video is often variable in bit rate, as are various other services. Therefore, for most of the time the capacity of the DSL link is sufficient, but during particular "bursty" moments the capacity of the single link is not sufficient. In such a case, it would be advantageous to have a second, shared link which can be used during those periods of time when the capacity of the DSL link is exceeded.

One approach to resolve this problem is to add a second DSL line and employ a function called "bonding". The addition of a second DSL line adds substantial cost, and may not be available in some service areas. Another approach to resolve this problem is adding a fiber link to the premise; however, this too adds substantial infrastructure cost, and may not be available in some service areas. A third approach to resolve this problem is to provide additional compression of the video signal; however, this has resulted in degraded picture quality.

What is desired is an arrangement under which link overload or congestion is managed by routing some communication data from one communication link during an overload or congestion period to a second communication link.

SUMMARY OF THE INVENTION

The present invention advantageously provides a system and method for managing congestion on heterogeneous network communication links. The system and method include at least two communication links having link technologies that are different from each other, where the quantity of information packets for transport across a first communication link is monitored, metered and analyzed to determine if a portion of the information packets should be routed to or transported by a second communication link. This arrangement minimizes link congestion and communication signal degradation or loss. A result is that the present invention provides improved link congestion management over current systems and methods without significant additional infrastructure cost.

In accordance with one aspect, the present invention provides a system for managing congestion on heterogeneous network communication links, the first communication link and second communication link being heterogeneous with respect to each other. The system includes a routing decision module, the routing decision module evaluating a queue of information packets scheduled for transmission across the first communication link to determine whether to generate a command signal to route a portion of information packets over the second communication link.

In accordance with another aspect, the present invention provides a method for managing congestion on heterogeneous network communication links, the first communication link and second communication link being heterogeneous with respect to each other, by monitoring a transmission queue of the first communication link, which transmission queue has one or more information packets to be transported, retrieving a threshold limit value corresponding to the first communication link, and evaluating the threshold limit value to determine which of the first and second communication links to use to transport at least a portion of one of the queued information packets. The method for managing congestion on heterogeneous network communication links may further include establishing a routing decision and generating a command signal to notify a routing device to route an excess amount of information packets of the first communication link over the second communication link.

In accordance with another aspect, the present invention provides an apparatus for receiving information packets on heterogeneous network communication links, a first communication link and a second communication link being heterogeneous with respect to each other, the apparatus including a first receiver for receiving information packets transported over the first communication link and a second receiver for receiving information packets transported over the second communication link.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

It is to be understood that both the preceding summary and the following detailed description are exemplary and explanatory and are intended to provide further explanation of the invention as claimed. Neither the summary nor the description that follows is intended to define or limit the scope of the invention to the particular features mentioned in the summary or in the description. The present invention provides a method, system and apparatus for managing congestion on heterogeneous network communication links.

Figure 1:
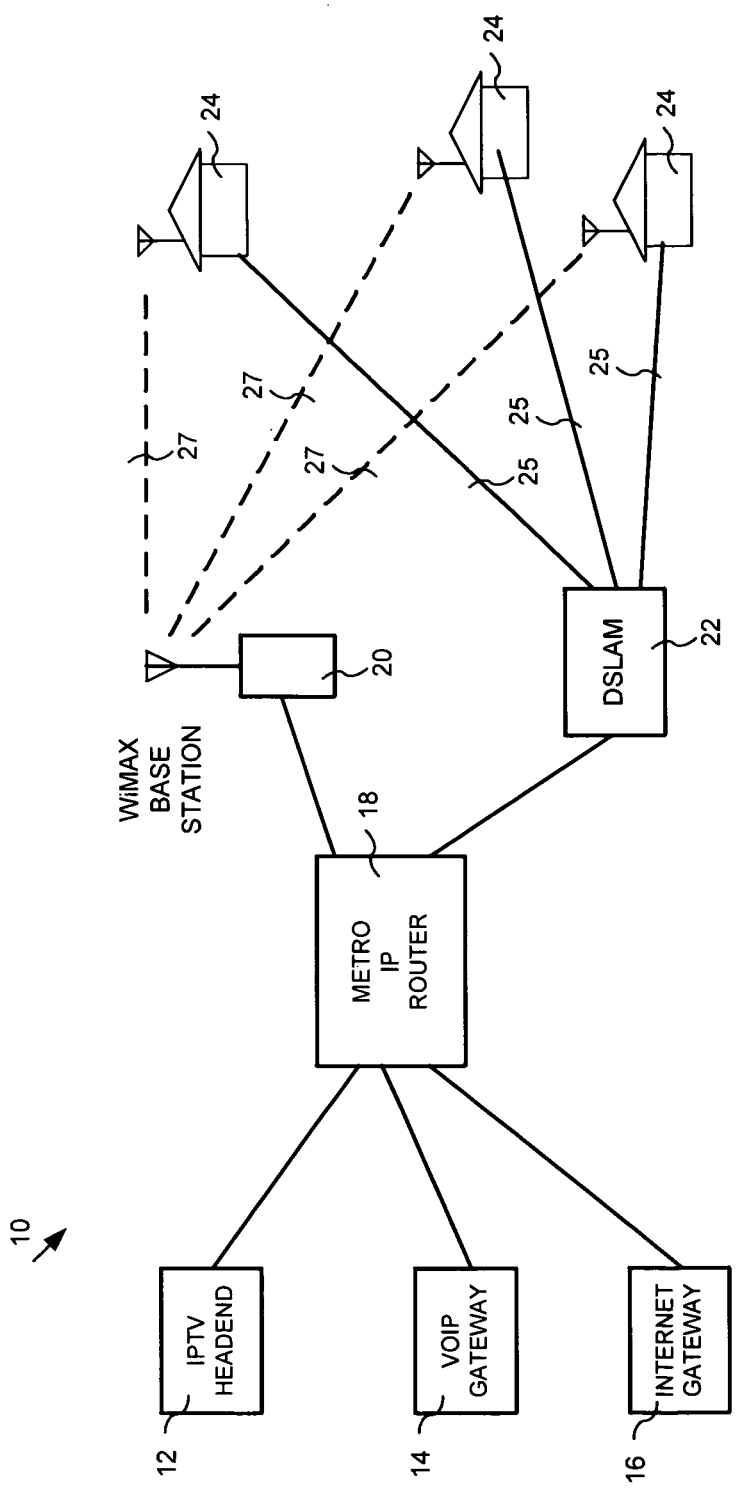
FIG. 1 is a block diagram of the network architecture of an interworking heterogeneous communication network constructed in accordance with the principles of the present invention.

Referring now to the drawing figures in which like reference designators refer to like elements, there is shown in FIG. 1, a block diagram of the network architecture of an interworking heterogeneous communication network constructed in accordance with the principles of the present invention and designated generally as "10". The network 10 includes a first communication link 25, e.g., digital subscriber line ("DSL") and a second communication link 27, e.g., an air interface link as defined by the Institute of Electrical and Electronics Engineers ("IEEE") 802.16 family of standards, officially referred to as wireless metropolitan area network ("Wireless MAN") and the corresponding worldwide interoperability for microwave access ("WiMAX") network architecture standard as defined by the WiMAX forum. Although the IEEE 802.16 family of standards is officially called WirelessMAN, it is commonly referred to as WiMAX. In one embodiment, the first communication link 25 can be a point-to-point communication link, such as DSL, cable and the like, while the second communication link 27 can be a point-to-multipoint communication link, such as WiMAX, wireless local area network ("WLAN"), high speed code division multiple access ("CDMA") and the like. In this embodiment, the second communication link 27 is a "shared" communication link, which means that the link is setup and deployed once but can be used by multiple first communication links 25 whenever one or more of the communication links 25 require extra capacity, such as during peak use periods.

The term "link" as used herein includes a line, channel, circuit or transmission path over which data are transmitted, and can refer to the physical cabling that connects nodes on a network, the signal that is communicated over a pathway or a subchannel in a carrier frequency. Therefore, while a wireless communication link may have multiple channels, the use of a single channel can be considered a "link".

The network 10 can include an IPTV headend server 12, a voice over Internet Protocol ("VoIP") gateway 14 and an Internet gateway 16 all coupled to an IP router 18. The IPTV headend server 12 is an originating point for IPTV signals in communication network 10, and provides IPTV/Video packets to the IP router 18 for transmission to the subscribers/users 24. The VoIP gateway 14 provides for the routing of voice conversation through network 10 and provides voice IP packets to the subscribers 24 via IP router 18. The Internet gateway 16 provides the routing of data files through network 10 and provides data IP packets to the subscribers 24 via IP router 18. In an alternative embodiment, the routing functions of IP router 18, including the routing decision subsystem and module, can be performed by the various servers and gateways such as IPTV headend server 12, VoIP gateway 14 and Internet gateway 16.

The network 10 can include a digital subscriber line access multiplexer 22 ("DSLAM"). The DSLAM 22 is a network device that receives signals from multiple customer 24 DSL connections 25 and aggregates the signals on a high-speed backbone line using multiplexing techniques. The DSLAM 22 can also support quality of service ("QoS") features such as contention, differentiated services ("DiffServ") and priority queues.

The communication network 10 further includes at least one base transceiver station 20 ("BTS"), which includes equipment for the transmission and reception of radio signals (i.e., transceivers), antennae, and equipment for encrypting and decrypting communications with a base station controller such as radio access router (not shown). The BTS 20 provides wireless communication links with the subscribers 24 over a radio interface, e.g., a channel of a WiMAX link 27. Additionally, the IP router 18 can control the BTS 20 and perform various control functions such as load control, admission control, packet scheduling, handover control, macrodiversity combining, security functions, mobility management, and the like. Alternatively, a separate radio access router may control the BTS 20 and perform the various control functions.

In another embodiment, multiple wireless links 27 (or multiple channels of a wireless link) can be used to provide the overload congestion protection for the DSL links 25, in the event that one wireless link 27 was insufficient or if it were desirous to have the wireless links 27 process certain IP multimedia packets, such as the IPTV/video packets, and accordingly not require additional bandwidth on DSL links 25.

The network 10 can also have an accounting mechanism, which implements a billing structure to ensure that revenue is collected by the owner of the respective primary and secondary links or paths. In general, accounting refers to the tracking of the consumption of network resources by users. This information may be used for management, planning, billing, or other purposes. Typical information that is gathered in accounting is the identity of the user, the nature of the service delivered, when the service began, and when it ended.

Figure 2:
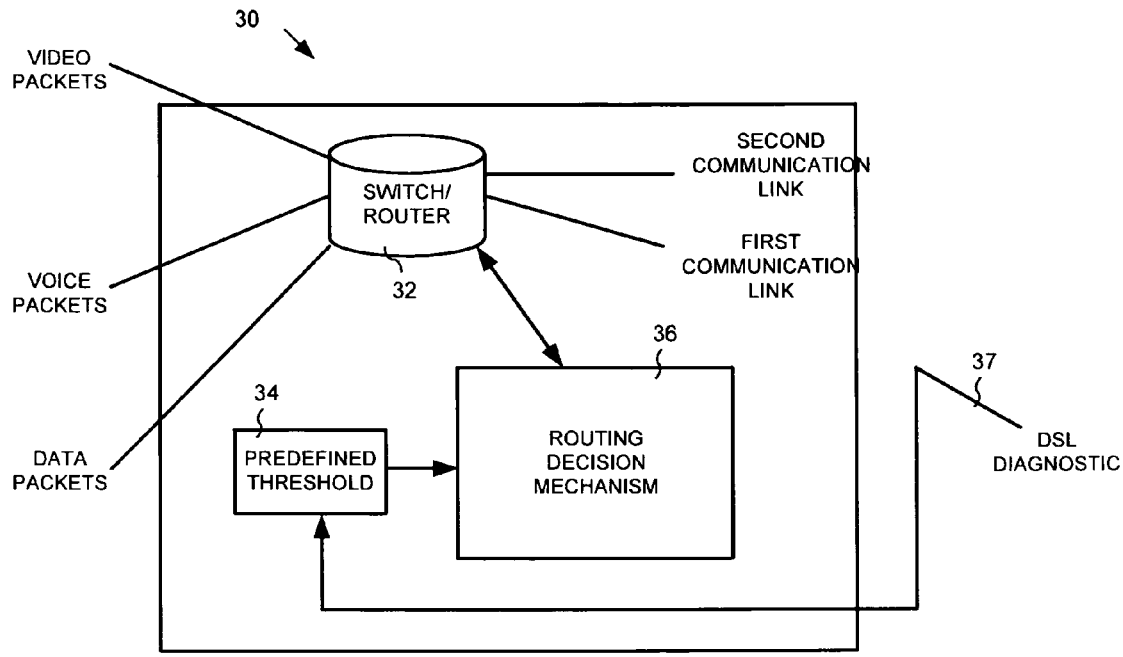
FIG. 2 is a block diagram of a routing decision module ("RDM") constructed in accordance with an embodiment of the present invention.

Referring to FIG. 2, there is shown a block diagram of a routing decision subsystem 30 of the communication network 10 constructed in accordance with the principles of the present invention. Routing decision subsystem 30 can include a switch/router 32, a routing decision module 36 ("RDM") in communication with the switch/router 32, and a predefined threshold module 34 in communication with RDM 34 and DSLAM 22. Routing decision subsystem 30 may be part of IP router 18, or it could have its functional elements residing in various network components of network 10, for example, IPTV headend server 12, VoIP gateway 14 and internet gateway 16. The switch/router 32 controls the routing of the IPTV/Video packets, voice packets and data packets to the subscribers 24. The RDM 36 can examine the size of the packet queue destined for the first communication link or path 25 and make a determination if the packets in that queue can be delivered during the next time interval based on a predefined threshold value. In other words, the RDM 36 examines the number of packets waiting to be routed through the DSL link 25 and compares this value to the capacity (or a percentage of the capacity) of the DSL link 25. If the number of packets scheduled to be transported or transmitted exceeds this threshold value, the RDM 36 will send a command to the switch/router 32 and the excess packets will be routed via a second communication link 27, e.g., a wireless link such as a WiMAX or a similar technology, instead.

In this embodiment, the predefined threshold module 34 can provide a predefined threshold value it has retrieved from a storage device, for instance, a memory chip or a server. Alternatively, the predefined threshold value could be derived from a DSL diagnostic signal 37 received as part of the diagnostic information from the DSLAM 22. In addition, the predefined threshold value could be application dependant and therefore be derived based on the application to be executed.

Many of the functional units described in this specification have been labeled as modules, in order to more particularly emphasize their implementation independence. For example, a module may be implemented as a hardware circuit comprising custom circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Figure 3:
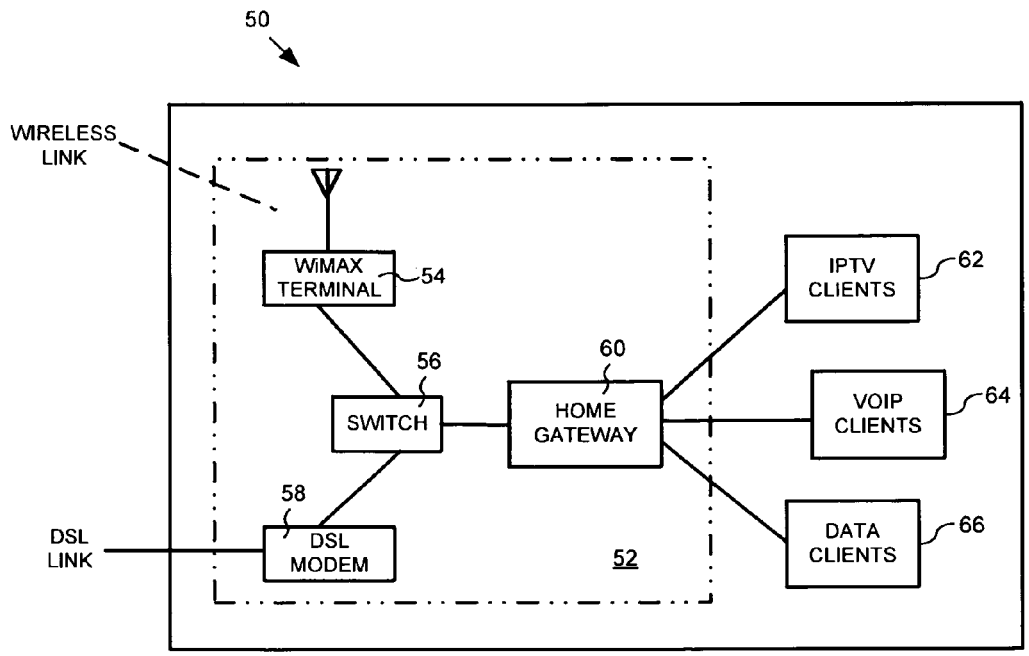
FIG. 3 is a block diagram of a receiver module constructed in accordance with an embodiment of the present invention.

FIG. 3 illustrates a block diagram of a home subsystem 50 of the communication network 10 constructed in accordance with the principles of the present invention. In this embodiment, home subsystem 50 resides within the subscribers/users 24 (shown in FIG. 1) of the communication network 10. The home subsystem 50 can include a transceiver module 52 that is in communication with the IPTV client devices 62, VoIP client devices 64 and Internet data client devices 66. The transceiver module 52 can include a wireless terminal 54 e.g., WiMAX technology, a switch 56, e.g., an Ethernet switch that can perform transparent bridging (i.e., connection of multiple network segments with forwarding based on media access control ("MAC") addresses) at full wire speed in hardware, a DSL modem 58 coupled to the DSL link 25 and the switch 56, and a home gateway 60 that is coupled to switch 56 and clients 62, 64 and 66. The home gateway 60 can provide for the reassembly of the IP packet data received at the wireless link 27 and the DSL link 25, security functions, codec and, in some embodiments, the function of switch 56. Similarly, in some embodiments the switch 56 can provide the packet reassembly function of the home gateway 60. Alternatively, the functions of the wireless terminal 54, switch 56, DSL modem 58 and home gateway 60 may be integrated into any number of combinations or variations to provide transceiver module 52. In this embodiment, a transceiver module 52 is in communication with the IPTV clients 62, VoIP clients 64 and Internet data clients 66 to which the transceiver module 52 transmits or provides IP multimedia packets, e.g., TV/video packets, voice packets and data packets, respectively.

Figure 4:
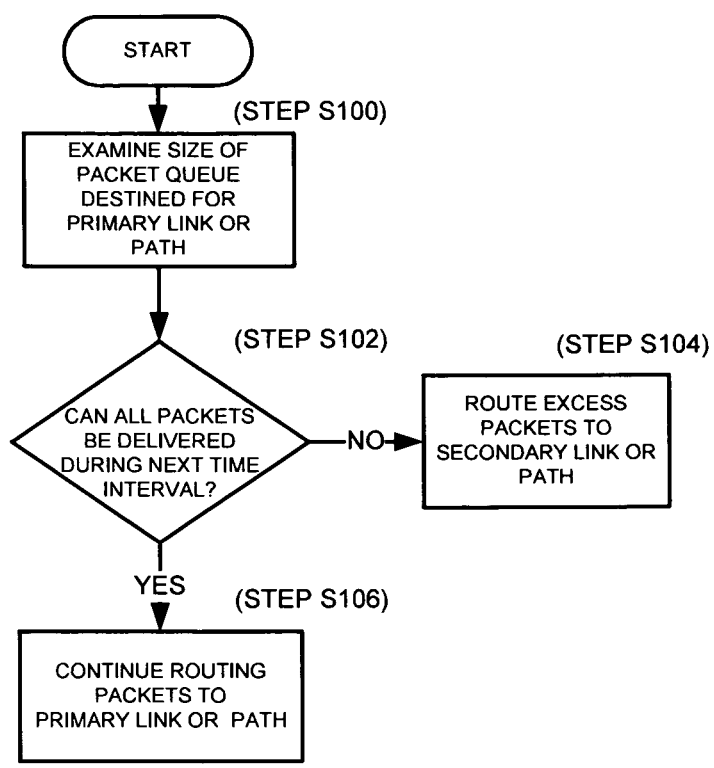
FIG. 4 is a detailed flowchart of a routing decision process in accordance with the principles of the present invention.

The operation of an embodiment of the routing decision module ("RDM") 36 of network 10 is discussed with respect to the flowchart of FIG. 4. In step S100, a routing decision module 36 examines the size of the packet queue destined for the primary link or path 25, e.g., DSL link. In step S102, the routing decision module 36 compares the number of packets waiting to be routed through the primary link or path 25 to the threshold value of the link, which may be the capacity, or a portion thereof, of the communication link 25 to determine whether all the waiting packets can be delivered during the next transmission time interval. If all the waiting packets cannot be delivered during the next transmission time interval, the routing decision module 36 with signal the IP router 18 (and/or the switch/router 32) to route the excess IP packets to the secondary link or path 27, e.g., WiMAX link (step S104). Otherwise, all the waiting packets can be routed through the primary link or path 25 (Step S106).

In another embodiment, the various types of multimedia IP packet data can be prioritized to allow one or more data types to be transported or transmitted over one of the links but not the other. For example, the first link or path 25 may have lower link latency than the second link or path 27 and in such a case; it may be more desirable to allow only less time-sensitive data over the second link.

The following simulated scenario exemplifies a typical scenario for a subscriber of the network 10. For typical very high bit rate DSL ("VDSL") links the access speed is 25 Mb/s, and is dedicated (i.e., a point-to-point communication link) to one subscriber. For typical WiMAX, the access speed is up to 70 Mb/s, and is shared among one or more subscribers, as a point-to-multi-point communication link. Single subscribers will normally use resources in the 0-15 Mb/s range. As such, a typical subscriber would probably not see congestion, as the "normal" usage for high-bit-rate video is modest with typically 45% of homes (peak) using TV, and of those, most would be tuned to a single program.

There may be, however, some number out of a typical service group of 100-500 subscribers that might be more intensive users of video services. As it is desirable to provide up to three high-definition television ("HDTV") programs (per subscriber), this could lead to an overload condition on a DSL link 25. Assuming that each of the HDTV programs requires resources of 5-12 Mb/s, that one VoIP program requires 90-100 kb/s, and that one data program requires 1-2 Mb/s, the peak or maximum resources required would be approximately 31.1 Mb/s, which exceeds the 25 Mb/s capacity of a DSL line, and results in the WiMAX link handling the overflow.

The present invention advantageously provides a method, system and apparatus for managing overload congestion on heterogeneous communication links of a network by employing a routing decision module that processes the packet queue destined for a first or primary link or path to determine if a potential overload congestion condition will occur and if so, the routing decision module will generate a signal instructing a router/switch to route a portion or excess amount of the information packets of the first communication link over the second communication link. By employing this improved routing decision scheme, the subscriber will not have to experience degraded service during peak usage intervals of the network.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system for managing congestion on heterogeneous network communication links, a first communication link and a second communication link being heterogeneous with respect to each other, the system comprising:
a transceiver coupled to the first communication link and the second communication link, the first communication link and the second communication link using different link technologies, the second communication link being a wireless link serving as an overload link to the first communication link, the transceiver configured to:
receive information packets from the first communication link and the second communication link, the first communication link and the second communication link configured to be simultaneously active; and
reassemble the information packets received from the first communication link and the second communication link,
a communication link threshold device, the communication link threshold device configured to store threshold limit values corresponding to a first communication link technology of the first link; and
a routing decision module, the routing decision module configured to evaluate a queue of information packets scheduled for transmission across the first communication link to determine whether to generate a command signal to route at least a portion of information packets over the second communication link, the routing decision module further configured to evaluate the threshold limit values from a diagnostic signal of a digital subscriber line access multiplexer to determine whether to generate the command signal to route at least the portion of information packets over the second communication link.

2. The system of claim 1, wherein the first communication link is a digital subscriber line.

3. The system of claim 1, wherein the second communication link is a WiMax network.

4. The system of claim 1, wherein the communication link threshold device is configured to derive the threshold limit values from a diagnostic signal of a digital subscriber line access multiplexer.

5. The system of claim 1, further comprising a third communication link, the third communication link being configured to transport the portion of information packets from the first communication link.

6. The system of claim 1, wherein the transceiver includes a first receiver configured to receive information packets transported over the first communication link and a second receiver configured to receive information packets transported over the second communication link.

7. The system of claim 6, wherein the first receiver is a digital subscriber line ("DSL") modem and the second receiver is a WiMax terminal.

8. The system of claim 1, wherein the transceiver includes a home gateway configured to reassemble the information packets transported over the first communication link and the second communication link.

9. The system of claim 1, further comprising an accounting module, the accounting module being configured to implement a billing structure to ensure that revenue is collected by the owner of the respective first and second communication links.

10. An apparatus for receiving information packets on heterogeneous network communication links, a first communication link and a second communication link being heterogeneous with respect to each other, the apparatus comprising:
- a first receiver configured to receive information packets transported over the first communication link;
- a second receiver configured to receive information packets transported over the second communication link, the first communication link and the second communication link using different link technologies, the second communication link being a wireless link configured to serve as an overload link to the first communication link, the first communication link and the second communication link configured to be simultaneously active; and
- a switch configured to reassemble the information packets from the first communication link and the second communication link;
- a communication link threshold device, the communication link threshold device configured to store threshold limit values corresponding to a first communication link technology of the first link; and
- a routing decision module, the routing decision module configured to evaluate a queue of information packets scheduled for transmission across the first communication link to determine whether to generate a command signal to route at least a portion of information packets over the second communication link, the routing decision module further configured to evaluate the threshold limit values from a diagnostic signal of a digital subscriber line access multiplexer to determine whether to generate the command signal to route at least the portion of information packets over the second communication link.

11. The apparatus of claim 10, wherein the apparatus further includes a home gateway coupled to one or more client devices, the home gateway in communication with the switch.

12. The apparatus of claim 10, wherein information packets of a first type are received on the first communication link and packets of a second type are received on the second communication link, the first type being different than the second type.

* * * * *